United States Patent [19]
Fujimori et al.

[11] 4,368,945
[45] Jan. 18, 1983

[54] INFRARED REFLECTING LAMINATED GLASS FOR AUTOMOBILE

[75] Inventors: Yoshitugu Fujimori, Tokorozawa; Masataka Kumata, Tokyo; Mamoru Mizuhashi, Yokohama, all of Japan

[73] Assignees: Asahi Glass Company, Ltd.; Honda Giken Kogyo Kabushiki Kaisha, both of Tokyo, Japan

[21] Appl. No.: 175,696

[22] Filed: Aug. 6, 1980

[30] Foreign Application Priority Data

Aug. 28, 1979 [JP] Japan .................................. 54-108620

[51] Int. Cl.³ .......................... G02B 5/28; G02B 5/22
[52] U.S. Cl. ...................................... 350/1.7; 350/166
[58] Field of Search .................. 350/1.6, 1.7, 164, 166

[56] References Cited
U.S. PATENT DOCUMENTS 3,298,898  1/1967  Gall ..................................... 350/1.1
3,630,809 12/1971  Edwards ............................. 350/1.6
3,682,528  8/1972  Apfel et al. .......................... 350/1.7
3,849,244 11/1974  Groth ................................... 350/1.7

Primary Examiner—Bruce Y. Arnold
Attorney, Agent, or Firm—Oblon, Fisher, Spivak, McClelland & Maier

[57] ABSTRACT

An infrared reflecting laminated glass having more than 70% transmission of visible rays comprising a pair of glass sheets with flexible, laminated interlayer films is disclosed wherein the interlayer films comprise a pair of polyvinyl butyral interlayer films which hold an infrared reflecting plastic film. The infrared reflecting plastic film is formed by sequentially coating, on a plastic film, a tungsten oxide layer havig a thickness of 180Å to 500Å or 1400Å to 1600Å, a silver layer having a thickness of 80Å to 150Å, and a tungsten oxide layer having a thickness of 180Å to 500Å or 1400Å to 1600Å, wherein at least one of the polyvinyl butyral interlayer films incorporates an ultraviolet absorbent.

6 Claims, 2 Drawing Figures

U.S. Patent        Jan. 18, 1983        4,368,945
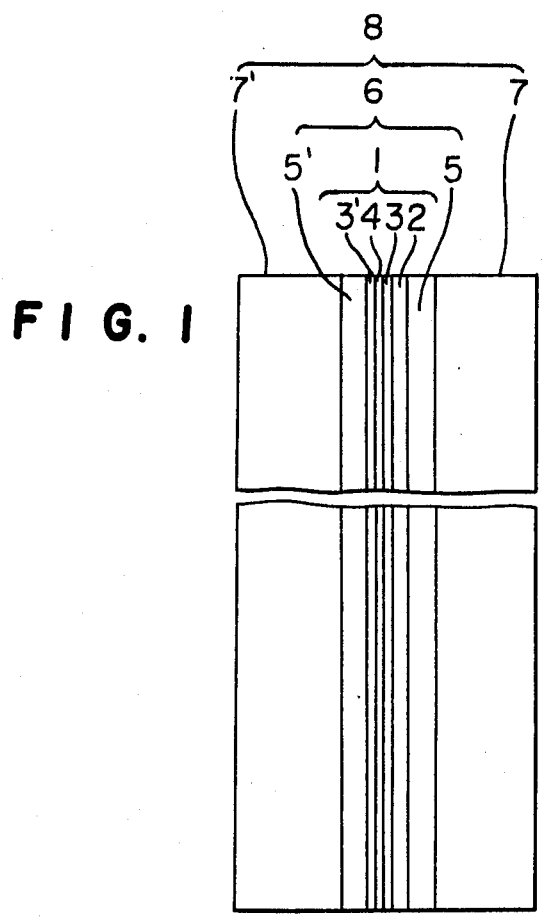
FIG. 1
FIG. 2
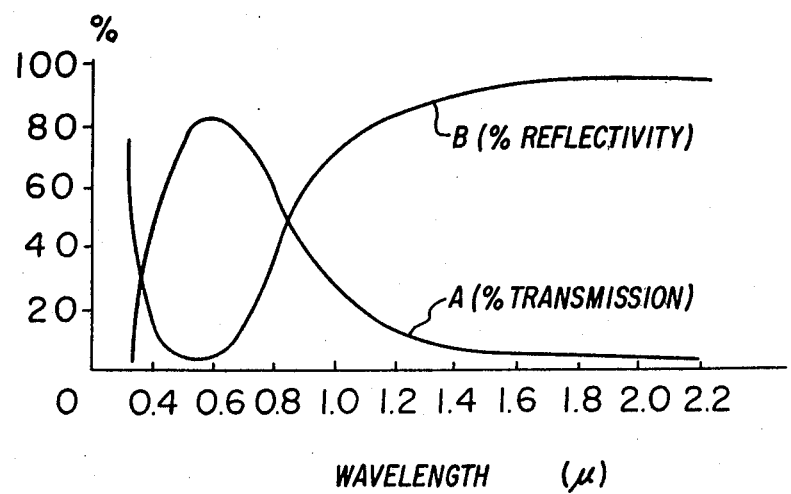

INFRARED REFLECTING LAMINATED GLASS FOR AUTOMOBILE

BACKGROUND OF THE INVENTION

1. Field of the Invention

The present invention relates to an infrared reflecting laminated glass for an automobile which has excellent characteristics.

2. Description of the Prior Art

It has been known to use an infrared reflecting glass which reflects infrared solar rays thereby preventing a temperature rise in a room or decreasing the energy load for cooling a room. It has been known that such infrared reflecting glass is formed by coating a metal layer made of gold, silver, copper or aluminum on a surface of a glass sheet or coating a metal oxide layer made of cobalt oxide, iron oxide, chromium oxide, titanium oxide or tin oxide on a surface of a glass sheet. It has been considered that such infrared reflecting glass is not suitable for an automobile because of low percent of visible ray transmission or high percent of visible ray reflectivity. It is possible to provide a thin metal layer or metal oxide layer for increasing the visible ray percent transmission. However, this has a disadvantage, viz a satisfactory infrared reflecting characteristic is not obtained for a front glass of an automobile because more than 70% of visible ray transmission is required by regulation. It is optimum to have less than 12% of visible ray transmission and less than 65% of solar ray transmission and to have the capacity for intercepting ultraviolet rays having a wavelength of 3900 Å or less. It has been difficult to obtain an infrared reflecting laminated glass which has satisfactory characteristics. There is no regulation for the visible ray percent reflectivity and the solar ray percent transmission. According to various experiments performed by the inventors, when the visible ray percent reflectivity is more than 12%, the visible ray percent transmission is too low for the glass to serve as an infrared reflecting glass for an automobile. Moreover, a reflected image adversely affects persons around the automobile. When the solar rays percent transmission is more than 65%, a satisfactory effect for preventing heat in a compartment of the automobile can not be expected. A deterioration of interiors in a compartment of the automobile by ultraviolet rays can be prevented by intercepting ultraviolet rays having a wavelength less than 3900 Å etc.

The inventors have proposed an infrared reflecting laminated glass which is prepared by producing an infrared reflecting plastic film formed by sequentially coating a tungsten oxide layer having a thickness of 180 Å to 500 Å or 1400 Å to 1600 Å, a silver layer having a thickness of 80 Å to 150 Å and a tungsten oxide layer having a thickness of 180 Å to 500 Å or 1400 Å to 1600 Å on a plastic film, with said infrared reflecting plastic film held between a pair of polyvinyl butyral interlayer films the outer surface of which each has a glass sheet laminated thereto. According to various tests for durabilities of the infrared reflecting laminated glass, the effect for absorbing ultraviolet rays is not enough, and the infrared reflecting plastic film is disadvantageously colored.

SUMMARY OF THE INVENTION

It is an object of the present invention to overcome the above-mentioned disadvantages and to provide an infrared reflecting laminated glass for an automobile which has a satisfactorily high percent of infrared ray reflectivity, a satisfactorily high percent of visible ray transmission, a low percent of visible ray reflectivity, a low percent of solar ray transmission and which is not colored.

The foregoing and other objects of the present invention have been attained by providing an infrared reflecting laminated glass having more than 70% of visible ray transmission which comprises a pair of glass sheets having flexible laminated interlayer films each comprised of a pair of polyvinyl butyral interlayer films, which hold an infrared reflecting plastic film formed by sequentially coating a tungsten oxide layer having a thickness of 180 Å to 500 Å or 1400 Å to 1600 Å, a silver layer having a thickness of 80 Å to 150 Å and a tungsten oxide layer having a thickness of 180 Å to 500 Å or 1400 Å to 1600 Å, wherein at least one of said polyvinyl butyral interlayer films incorporates an ultraviolet absorbent.

BRIEF DESCRIPTION OF THE DRAWINGS

FIG. 1 is a schematic sectional view of one embodiment of the infrared reflecting laminated glass of the present invention; and FIG. 2 shows the optical characteristic of the infrared reflecting laminated glass of the present invention.

DETAILED DESCRIPTION OF THE PREFERRED EMBODIMENTS

The plastic film for coating infrared reflecting layers used in the infrared reflecting laminated glass of the present invention is preferably a polyethyleneterephthalate film such as a polyester film, which has high transparency flexibility, is not easily broken, is easily processed, is easily and continuously coated with infrared reflecting layers at high speed, and has high weathering resistance and chemical stability. It is optimum to use a plastic film having more than 80% of a visible ray transmission and a thickness of 25 to 125$\mu$.

The infrared reflecting layers formed on the plastic film such as polyethyleneterephthalate film are selected so as to meet the regulation for a window glass for an automobile which regulation requires more than 70% of a visible ray transmission. The infrared reflecting layers have a three layer structure formed by sequentially coating a tungsten oxide layer, a silver layer and a tungsten oxide layer each of which have desired thicknesses. Among the infrared reflecting layers, the silver layer is selected as the middle layer because it has a high infrared reflecting characteristic, and an optimum reflection hue and an optimum transmission hue for a window glass for an automobile. The silver layer can be made of silver as the major component but with another metal such as Cr, Ni, Al and Ti incorporated at a ratio of less than 10%. Another additive may serve to improve the optical, chemical or mechanical characteristics of the infrared reflecting glass.

The thickness of the silver layer is preferably in the range of 80 Å to 150 Å so as to provide more than 70% of visible ray transmission and less than 12% of visible ray reflectivity and a satisfactory percent of infrared ray reflectivity.

In the structure of the infrared reflecting layers, reflection reducing layers sandwich the silver layer so as to prevent reduction of the visible ray percent transmission of the silver layer. The reflection reducing layers can be various non-absorbing dielectrics having more than 2.0 of a reflective index. The tungsten oxide layer is selected as the reflection reducing layers because of high visible ray percent transmission and high reflection reducing effect, excellent hue, excellent adhesiveness to the silver layer and the surface of the glass sheet and desirable chemical, mechanical and optical characteristics. The tungsten oxide layer is made of tungsten oxide as the major component and can incorporate less than 10% of another additive.

The thickness of the tungsten oxide layer is preferably in a range of 180 Å to 500 Å or 1400 Å to 1600 Å depending on the reflection reducing condition, the visible ray percent transmission and the hue.

An infrared ray reflecting laminated glass having 5 mm of a thickness comprising a pair of polyvinyl butyral films holding an infrared reflecting plastic film coated with only a silver layer having a thickness of 180 Å to 500 Å, has a visible ray percent transmission of about 20 to 40%. This is not suitable for a front window glass of an automobile which requires the visible ray percent transmission of more than 70%.

In the infrared ray reflecting layers having the three layer structure including reflection reducing layers, a visible ray percent transmission is remarkably increased by photointerference. For example, a laminated glass made of two sheets having each thickness of 2.5 mm has usually a visible ray percent transmission of about 70 to 75%. A visible ray percent reflectivity can be reduced to less than 10% and percent reflectivities in the infrared region can be maintained at high levels, for example, 65% at $0.9\mu$ of a wavelength; 70% at $1.0\mu$ of a wavelength and 90% at $1.5\mu$ of a wavelength. A vacuum evaporation coating method is usually employed in the formation of the infrared reflecting layers having the three layer structure on the surface of the film of the present invention.

One example of the vacuum evaporation coating method will be illustrated.

In a vacuum tank in 1 to $5 \times 10^{-5}$ torr, each of the evaporation coating materials is heated to deposit the tungsten oxide layer, the silver layer and the tungsten oxide layer in each desired thickness, on a polyethyleneterephthalate film heated at about 20° to 80° C. The silver and tungsten oxide layers can be also coated by a spattering method or an ion plating method instead of the vacuum evaporation coating method. It is also possible to form the silver layer by a chemical plating method and to form the tungsten oxide layer by C.V.D. method or C.L.D. method.

When the coated layers of the infrared reflecting plastic film are exposed to the atmosphere, the chemical durability and the mechanical durability are inferior. In order to overcome the disadvantage and to make easy the lamination of a pair of glass sheets, the infrared reflecting plastic film is sandwiched between a pair of polyvinyl butyral interlayer films. The flexible laminated films are held between a pair of glass sheets to press-bond them.

When two glass sheets having each thickness of about 2 to 5 mm are laminated, a visible ray percent transmission of the laminated glass is decreased for about 5 to 15%. In order for provide more than 70% of a visible ray percent transmission, it is preferable to provide about 80 to 85% of a visible ray percent transmission of the infrared reflecting plastic film having the infrared reflecting layers in three layer structure.

When two glass sheets having each thickness of about 2 to 5 mm are laminated, a visible ray percent transmission of the laminated glass is further decreased to about 5%. In order to provide more than 70% of a visible ray percent transmission, it is preferable to use each glass sheet having a visible ray percent transmission ranging from 85 to 90%. It is preferable to use each glass sheet having a thickness ranging from about 1.5 to 3 mm for the laminated glass so that there is only a small loss of visible ray percent transmission.

In the present invention, the polyvinyl butyral interlayer films of 0.3–0.7 mm thickness sandwiching the infrared reflecting plastic film are prepared by incorporating an ultraviolet absorbent so as to intercept ultraviolet rays especially ultraviolet rays having wavelengths of less than 3900 Å. The ultraviolet absorbents for plastics are compounds having large ultraviolet absorption: benzophenones such as 2,4 dihydroxybenzophenone; 2-hydroxy-4-methoxybenzophenone; 2-hydroxy-4-n-octoxybenzophenone; 4-dodecyloxy-2-hydroxybenzophenone; 2-hydroxy-4-octadecyloxybenzophenone; 2,2' dihydroxy-4-methoxybenzophenone; 2,2' dihydroxy-4,4' dimethoxybenzophenone; 2,2' dihydroxy-4-methoxybenzophenone; 2,2', 4,4' tetrahydroxybenzophenone; 2-hydroxy-4-methoxy-5-sulfobenzophenone; 2-hydroxy-4-methoxy-2'-carboxybenzophenone; 2,2' dihydroxy-4,4' dimethoxy-5-sulfobenzophenone; 2-hydroxy-4-(2-hydroxy-3-methyl aryloxy) propoxybenzophenone; and 2-hydroxy-4-chlorobenzopheone; benzotriazoles such as 2(2' hydroxy-5-methylphenyl) benzotriazole; 2(2'-hydroxy-3',5'-ditert-butyl phenyl) benzotriazole; and 2(2' hydroxy-3'-tert,butyl-5'-methylphenyl) benzotriazole; salicylates such as phenyl salicylate; carboxyphenyl salicylate; p-octylphenyl salicylate; strontium salicylate; p-tert,butylphenyl salicilate; methyl salicylate; and dodecyl salicylate; and also other ultraviolet absorbents such as resorcinol monobenzoate; 2' ethyl hexyl-2-cyano; 3-phenylcinnamate; 2-ethyl-hexyl-2-cyano-3,3-diphenyl acrylate; ethyl-2-cyano-3,3-diphenyl acrylate; [2-2'-thiobis(4-t-octyl phenolate)]-n-butylamine nickel; asymmetric oxalic acid diaryl amido (A—NH—Co—Co—NH—B); aromatic dihydric compound such as the ester derivatives of 4,4-bis(4'-hydroxy phenyl) pentanoic acid; oxyganosilicon compounds,

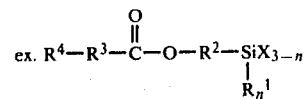

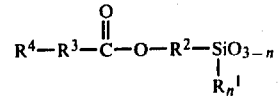

($R^1$: monovalent hydrocarbon radical,
$R^2$: divalent hydrocarbon radical,
$R^3$: divalent hydrocarbon radical).

The ultraviolet absorbent is preferably incorporated at a ratio of 0.5 to 5 wt.% based on the polyvinyl butyral interlayer film, for example, the ultraviolet absorbent is incorporated at a ratio of 1 to 5 wt.% for a polyvinyl butyral interlayer film having a thickness of 0.3 mm and at a ratio of 0.5 to 3 wt.% for a polyvinyl butyral interlayer film having a thickness of 0.7 mm.

The ultraviolet absorbing polyvinyl butyral interlayer film is preferably used for each of the polyvinyl butyral films used in both sides of the infrared reflecting plastic film. In some cases, it is possible to use the ultraviolet absorbing polyvinyl butyral interlayer film only for the outer or inner polyvinyl butyral interlayer film for an automobile. When the ultraviolet absorbent is incorporated in the polyvinyl butyral interlayer film, the molecule of the polyvinyl butyral can be stabilized by the oxidation inhibiting effect and ultraviolet ray absorbing effect of the ultraviolet absorbent, whereby a humidity resistance can be improved to increase the durability of the infrared reflecting plastic film.

The ultraviolet absorbent in the polyvinyl butyral are effective in preventing the deterioration of the tungsten oxide layer. This is the signficant effect of the combination of the ultraviolet absorbent, polyvinyl butyral and tungsten oxide layer. It is preferable to use the ultraviolet absorbing polyvinyl butyral interlayer film in contact with the tungsten oxide layer.

It is also possible to incorporate a ultraviolet absorbent in the polyethyleneterephthalate film on which tungsten oxide layer is formed. The kind and quantity of the ultraviolet absorbent are the same.

FIG. 1 shows schematic sectional view of the infrared reflecting laminated glass for an automobile as one embodiment of the present invention. The infrared reflecting plastic film (1) comprises a polyethyleneterephthalate film (2), coated with a tungsten oxide layer (3), a silver layer (4) and a tungsten oxide layer (3'). The infrared reflecting plastic film (1) is sandwiched between a pair of polyvinyl butyral interlayer films (5), (5'). The flexible laminated films (6) are sandwiched between a pair of glass sheets (7), (7') to form the infrared reflecting laminated glass (8).

In the embodiment shown in FIG. 1 the infrared reflecting plastic film (1) is sandwiched between pair of polyvinyl butyral films. It is also possible to superpose one or more polyvinyl butyral film to the flexible laminated films.

The present invention will be further illustrated by certain examples which are provided for purposes of illustration only.

EXAMPLE 1

A polyethyleneterephthalate film (a thickness of 50μ; a length of 50 cm and a width of 100 cm) was washed and dried and placed in a vacuum tank of a vacuum evaporation coating apparatus. The vacuum tank was evacuated to a vacuum degree of $10^{-5}$ torr and the film was kept at 50° C. Two boats for evaporating sources were placed in the vacuum tank and a silver rod and tungsten oxide powder were respectively charged in each boat. The tungsten oxide was heated at 1200° C. to coat a tungsten oxide layer at a deposition speed of 10 Å/sec. whereby a tungsten oxide layer having 350 Å of a thickness was formed on the polyethyleneterephthalate film.

The silver was heated at 1400° C. to coat a silver layer at a deposition speed of 20 Å/sec. whereby a silver layer having 100 Å is formed on the tungsten oxide layer having 350 Å of a thickness.

A tungsten oxide layer having 350 Å of a thickness is further coated on the silver layer by the same method. The resulting infrared reflecting plastic film was sandwiched between a pair of ultraviolet absorbing polyvinyl butyral films having each thickness of 30 mil. (Therflex XA manufactured by Mitsubishi Monsanto Co.) The laminated films were further held between a pair of glass sheets (a thickness of 2.5 mm; a length of 50 cm; a width of 100 cm) and laminated by the conventional heat-press bonding method. The polyvinyl butyral film comprised benztriazole at a ratio of 3 wt.%.

FIG. 2 shows a spectral transmittance curve and a spectral reflectance curve of the resulting infrared reflecting laminated glass.

According to a boiling test, a natural exposing test, a weather meter test, it was confirmed that the infrared reflecting laminated glass had enough durability in practical use.

We claim:

1. An infrared reflecting laminated glass having more than 70% transmission of visible rays comprising a pair of glass sheets with flexible laminated interlayer films wherein said laminated interlayer films comprise a pair of polyvinyl butyral interlayer films which hold an infrared reflecting plastic film, said infrared reflecting plastic film formed by sequentially coating, on a plastic film, a tungsten oxide layer having a thickness of 180 Å to 500 Å or 1400 Å to 1600 Å, a silver layer having a thickness of 80 Å to 150 Å and a tungsten oxide layer having a thickness of 180 Å to 500 Å or 1400 Å to 1600 Å wherein at least one of said polyvinyl butyral interlayer films incorporate an ultraviolet absorbent.

2. The infrared reflecting laminated glass according to claim 1 wherein said infrared reflecting laminated glass has less than 12% reflectivity of visible rays.

3. The infrared reflecting laminated glass according to claim 1 wherein said infrared reflecting laminated glass has less than 65% transmission of solar rays.

4. The infrared reflecting laminated glass according to claim 1 wherein said infrared reflecting laminated glass has less than 12% of visible ray reflectivity and less than 65% of solar ray transmission.

5. The infrared reflecting laminated glass according to claim 1 wherein said polyvinyl butyral interlayer films absorb more than 90% of the ultraviolet rays having wavelengths of less than 3900 Å.

6. The infrared reflecting laminated glass according to claim 1 wherein at least one of said polyvinyl butyral interlayer films incorporates said ultraviolet absorbent at a weight mixture ratio of 0.5 to 3% of said film weight.

* * * * *